United States Patent [19]

Kitamura et al.

[11] Patent Number: 4,870,567
[45] Date of Patent: Sep. 26, 1989

[54] MICROPROGRAM CONTROL SYSTEM

[75] Inventors: Toshiaki Kitamura, Ota; Katsumi Onishi, Kawagoe, both of Japan

[73] Assignee: Fujitsu Limited, Kawasaki, Japan

[21] Appl. No.: 755,321

[22] PCT Filed: Nov. 8, 1984

[86] PCT No.: PCT/JP84/00534
 § 371 Date: Jun. 25, 1985
 § 102(e) Date: Jun. 25, 1985

[87] PCT Pub. No.: WO85/02277
 PCT Pub. Date: May 23, 1985

[30] Foreign Application Priority Data

Nov. 11, 1983 [JP] Japan ................................ 58-212015

[51] Int. Cl.⁴ ................................................ G06F 9/00
[52] U.S. Cl. ................................ 364/200; 364/262.8;
 364/261.3
[58] Field of Search ... 364/200 MS File, 900 MS File

[56] References Cited

U.S. PATENT DOCUMENTS

| | | | |
|---|---|---|---|
| 4,005,391 | 1/1977 | MacPherson | 364/200 |
| 4,047,247 | 9/1977 | Stanley et al. | 364/200 |
| 4,210,960 | 7/1980 | Borgerson et al. | 364/200 |
| 4,337,510 | 6/1982 | Maezumi | 364/200 |
| 4,394,735 | 7/1983 | Satoh et al. | 364/200 |
| 4,467,415 | 8/1984 | Ogawa | 364/200 |
| 4,488,224 | 12/1984 | Ippolito et al. | 364/200 |

FOREIGN PATENT DOCUMENTS

| | | |
|---|---|---|
| 0032955 | 5/1979 | European Pat. Off. |
| 0087008 | 4/1983 | European Pat. Off. |
| 84904161 | 3/1986 | European Pat. Off. |

Primary Examiner—Gareth D. Shaw
Assistant Examiner—John G. Mills
Attorney, Agent, or Firm—Staas & Halsey

[57] ABSTRACT

The present invention includes a suboperation code control memory which stores data for generating a heading address of a microprogram for an instruction having a suboperation code. Access to an operation code control memory by the ordinary operation code and the access to suboperation code control memory are carried out simultaneously. The heading address of the microprogram is generated by editing the data read from the respective control memories. The storage capacity needed for the suboperation memory is reduced and still no problem occurs in assigning microinstruction addresses, and the heading address of a microprogram for the instruction having a relevant suboperation code is produced without any additional time.

7 Claims, 3 Drawing Sheets

MICROPROGRAM CONTROL SYSTEM

CROSS REFERENCES TO RELATED APPLICATIONS

This application is related to U.S. applications having Ser. Nos. 758,665 (now U.S. Pat. No. 4,802,113); 752,190 and 758,664 (now U.S. Pat. No. 4,812,970).

BACKGROUND OF THE INVENTION

1. Field of the Invention

The present invention relates to a microprogram control system and particularly to a microprogram control system in a data processing unit of a pipeline control system where the processing for reading a desired microinstruction is conducted at a high speed even when executing an instruction having a suboperation code.

2. Description of the Related Art

As shown in FIG. 1, for example, a prefetched instruction is executed by a pipeline processing unit having respective stages D, A, T, B, E and W. In FIG. 1, 1 is an instruction word or instruction register; 2 is a control memory or storage storing microinstructions; 3 to 7 are microinstruction field registers providing instructions or control signals to the hardware of stages D to W, 8 is a general purpose register group; 9 is a base register; 10 is an index register; 11 is a displacement register; 12 is an address calculating part or three input adder; 13 is a logical address register; 14 is TLB (address translation buffer); 15 is an address buffer; 16 is a buffer memory; 17 is an operand register; 18 to 20 are operand buffer registers; 21 is an operand register; 22 is an operation unit; and 23 is a result register The general purpose register group 8 is the same register group used in the three timings of D, B and W.

When an instruction 1 is supplied to the pipeline shown in FIG. 1, the microinstruction required for executing the relevant instruction 1 is read from control memory 2 in the stage D (decode) and loaded into the register 3 and values are loaded into the registers 9, 10, 11 in order to calculate the address of the operand (operand 2 in the figure) which is required for execution of the relevant instruction 1. The address of the operand is calculated by the calculation part 12 in the stage A (address) and the address is then loaded into the logic address register 13. The TLB 14 and buffer memory 16 are indexed through the stages T (translate) and B (buffer access) and a value for the operand 2 is loaded into the register 17. At this time, a value of operand 1 is also loaded into the register 21. From this state, the specified operation is carried out by the operation unit 22 in the stage E (execute) and the relevant operation result is loaded into the general purpose register 8 in the stage W (write).

Pipeline control is carried out as explained above, however, the processing corresponding to the respective stages is continued in such a form including reading the microinstruction from the control memory 2 (indicated in the figure) and executing it. Instructions are executed by the processing in the pipeline processing portion.

With the recent increase in the amount of data to be processed and diversification in the kinds of data processing performed, the requirement for enhancement of functions is increasing and, as a result, the number of different instructions executed by a pipeline processor also tend to increase. As a result, pipeline instructions having suboperation codes are increasing and the processing time necessary for reading the desired microinstruction corresponding to the instructions having the relevant suboperation code becomes a problem. Namely, it is a problem to coordinate the many processes by the pipeline processing portion. Moreover, in the data processing unit having suboperations, a single microprogram storage means (control memory 2) is provided with a field for storing branching data corresponding to the suboperation code. The control memory is accessed by the ordinary operation code and when it is sensed that the instruction has a suboperation code by means of the data read above, the control memory is accessed again by the suboperation code and the heading address of a microprogram for the instruction is obtained based on the data read as a result of the access. The access to control memory is carried out sequentially and, as a result, excessive control memory access operations are required.

This problem can be solved by using an address in the suboperation instructions having a length which includes the entire operation code and suboperation code as well as using such a length for the instructions having no suboperation code as the address for the first access to the control memory. However, in such a case, the needed capacity of the control memory increases until it is not practical.

SUMMARY OF THE INVENTION

Considering the disadvantages of the prior art, it is an object of the present invention to provide a system for obtaining, at high speed, the heading address of a microprogram for an instruction having a suboperation code in a data processing unit which processes instructions, having suboperation codes, by microprogram control.

According to the present invention, the object can be attained by providing first means for storing the branching data to be checked by the suboperation code and second means for calculating the heading address of a microprogram of the instruction having the suboperation code on the basis of the branching data, and by reading the heading microinstruction of the instruction having the suboperation code using the first and second means. The present invention has an advantage in that the heading address of the microprogram of the instruction having the suboperation code can be obtained at high speed without a significant increase in the amount of hardware.

Briefly, the present invention provides a suboperation control memory (hereinafter referred to as SUBOPCS) which stores data for generating the heading address of the microprogram of the instruction having the suboperation code. The access to an operation code control memory by the ordinary operation code and the access to the SUBOPCS by the suboperation code occurs simultaneously. The data read from a respective control memory is edited to generate the heading address of the microprogram. This approach reduces the capacity needed for the SUBOPCS to within a range which does not cause problems in the assignment of microinstruction.

DESCRIPTION OF THE PREFERRED EMBODIMENTS

Figure 1:
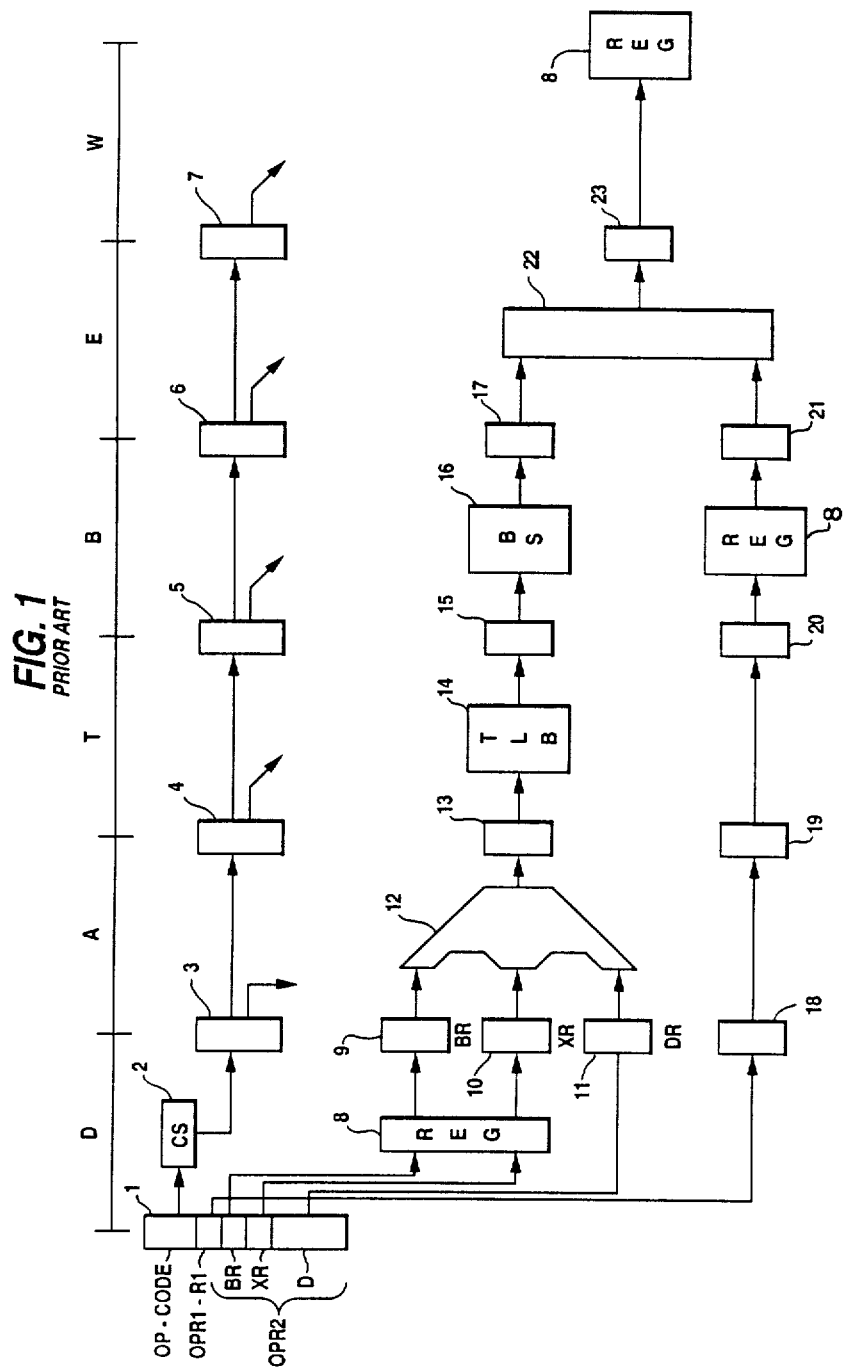
FIG. 1 depicts the essential portion for executing instructions by a pipeline processing method.
Figure 2:
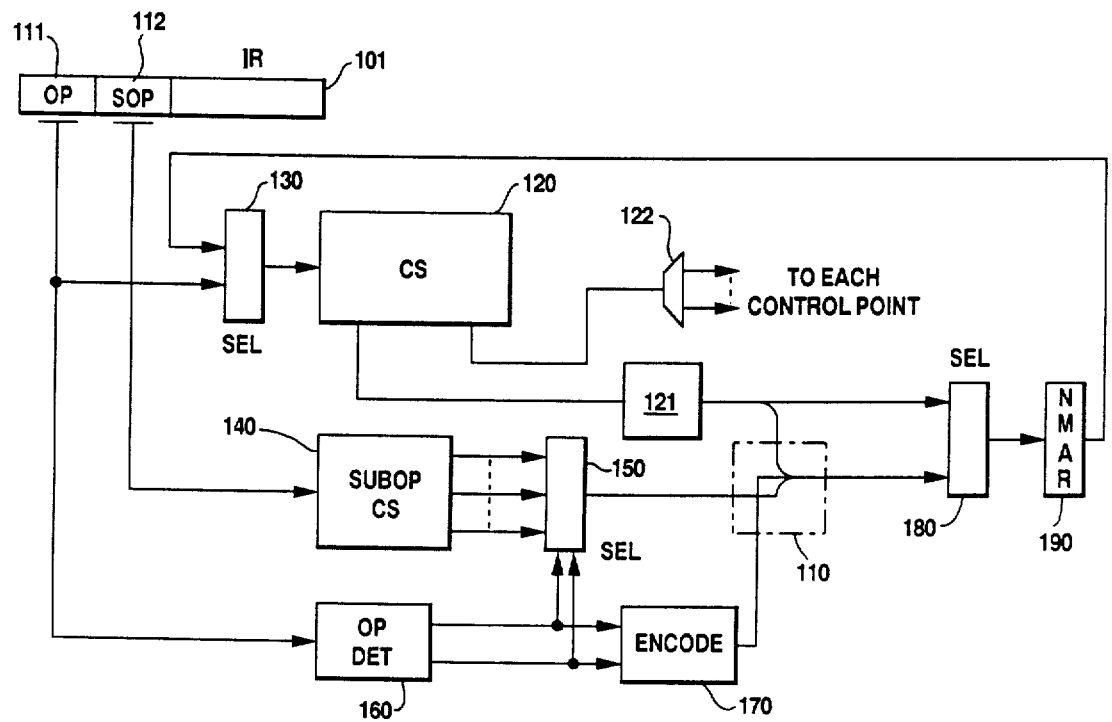
FIG. 2 is a block diagram of an embodiment of the present

In FIG. 2, 101 is an instruction register (IR) (corresponding to 1 in FIG. 1), 111 is an operation code area (OP), 112 is a suboperation code area (SOP). 120 is a control memory (CS - corresponding to 2 in FIG. 1). The microinstruction is decoded by decoder (DEC) 122, a control signal for each control point in the pipeline execution unit is output and the microaddress of microinstruction to be executed next is generated by the next microaddress generating circuit 121 and merging circuit 110, as required. 130 is a selector (SEL), 140 is a suboperation control memory (SUBOPCS) required for the present invention and for storing the data used for generating the heading address of a microprogram of the instructions having the suboperation code as explained above. 150 is a selector (SEL), 160 is a detector (OPDET) which detects or recognizes operation codes of instruction having the suboperation codes based on the data in the operation code portion (OP) of the instruction register 1, 170 is an encoder (ENCDE), 180 is a selector (SEL), and 190 is a next microaddress register (NMAR).

First, when an instruction is loaded into the instruction register (IR) 101, if the instruction does not have a suboperation code area (SOP), access is made to the control memory (CS) through the selector (SEL) 130 by the operation code area (OP) of instruction register (IR) 101, and the heading or first microinstruction of a microprogram corresponding to the operation code area (OP) of the instruction is output. The obtained microinstruction is decoded by the decoder (DEC) 122, and a control signal for each control point is output to execute the instruction.

The microinstruction next to or after the heading microinstruction can be obtained by loading the address generated by inputting the next address field data of the microinstruction read from the control memory (CS) into the next microaddress register (NMAR) 190 through the selector (SEL) 180, and accessing the control memory (CS) 120 again through the selector (SEL) 130 with the next address.

When an instruction having a suboperation code (SOP) is loaded into the instruction register (IR) 101, access is made to the control memory (CS) 120 through the selector (SEL) 130 by the operation code area (OP) of the instruction in the first execution cycle of the instruction and simultaneously access is made to the SUBOPCS 140 by the suboperation code area (SOP). In addition, the operation code (OP) of the instruction is input into the detection circuit (OPDET) 160 and the signal line corresponding to the operation code (OP) is activated to "1" at the output of the detection circuit (OPDET) 160 if an operation code (OP) having a suboperation code (SOP) is required.

The output signal line from the detection circuit 160 is used for generating the data which helps produce the heading address of the microprogram of the instruction having the suboperation code (SOP). That is, it is used for selecting the heading address data corresponding to the operation code (OP) of the instruction having the suboperation code in the selector (SEL) 150 from a pair of output data (described later) produced by the SUBOPCS 140.

When the suboperation code (SOP) causes an output by the suboperation control memory, a different microprogram is read in dependence on a value of the operation code (OP), that is, plural suboperation microprogram addresses correspond to a single suboperation code but only one of the plural addresses is selected based on the operation code. As a result, it must be previously known or determined how many kinds of operation codes (OP) correspond to a certain value of the suboperation code (SOP). Therefore, the suboperation heading address data corresponding respectively to the operation codes (OP) are also written together for as many as the number of relevant codes (OP) at the address position in the SUBOPCS 140 which is indexed with the suboperation code (SOP) used as the address data. A set of output data of the SUBOPCS 140 includes a plurality of heading address data written at the same address as mentioned above. It is designated by the signal line extending from detection circuit (OPDET) 160 which should be selected from among the plurality of heading address data.

The signal line is coded by the encoding circuit (ENCDE) 170 and is used as a part of the heading address data.

Figure 3:
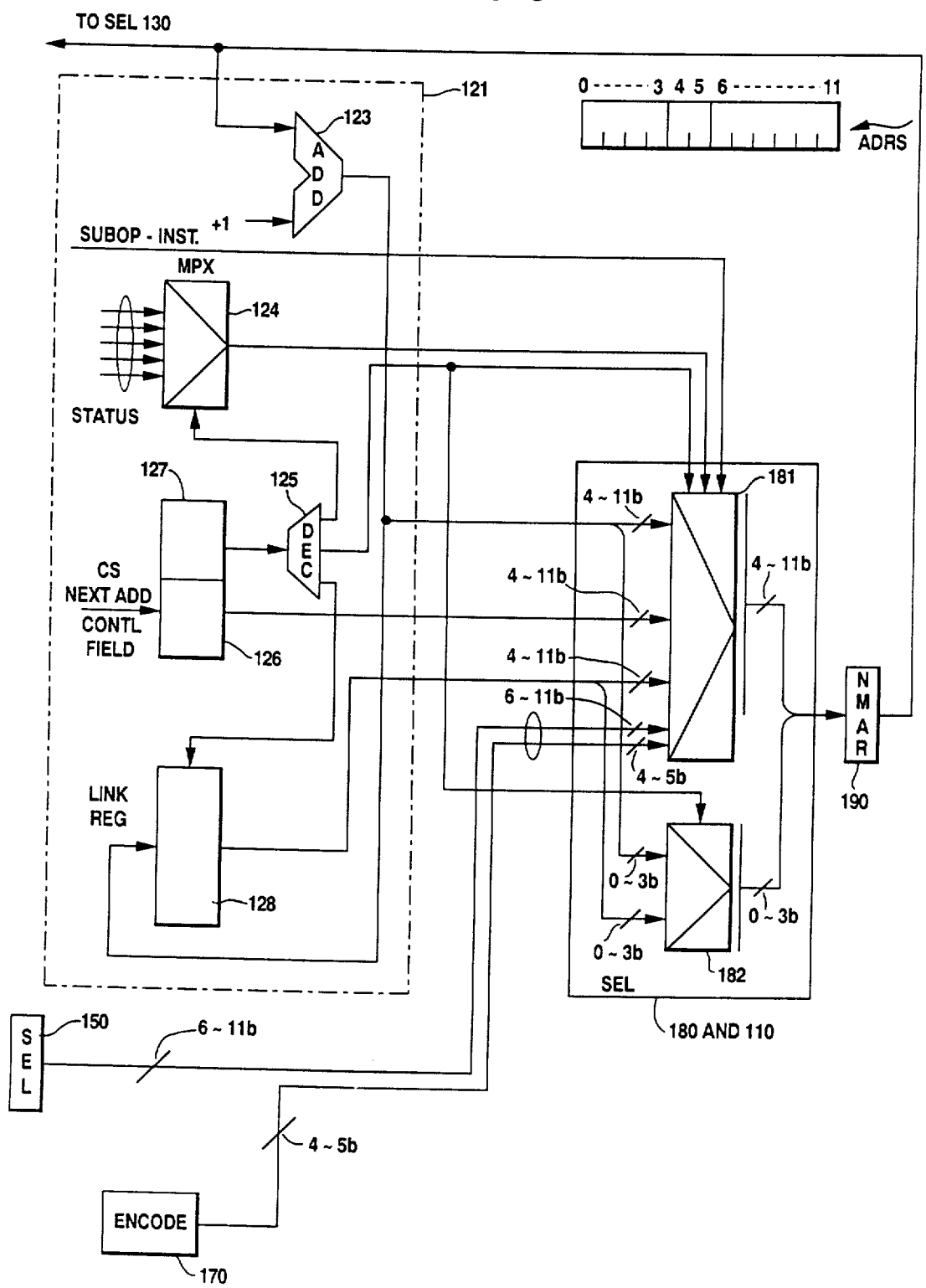
FIG. 3 is a detailed diagram of the address generating circuit 121 in FIG. 2.

FIG. 3 shows the details of the address generating part corresponding to the next microaddress generating circuit 121, selector 180 and merging circuit 110 shown in FIG. 2. The numerals 121, 150, 170, 180, 190 correspond to those in FIG. 2, respectively. The next microaddress generating circuit 121 comprises a +1 circuit 123 for incrementing a microaddress, a selection circuit 124 which receives status data during processing and outputs selected status signals, decoder 125, a holding register 126 into which the next address control field in the microinstruction is loaded, a holding register 127 into which the control code (branching conditions, etc.) in the relevant field is loaded and a link register 128 which holds the return address while the relevant branching processing is completed during the branching process.

In selector 180, a first multiplexer 181 which selects the data in units of 8 bits and a second multiplexer 182 which selects the data in units of 4 bits are provided.

When the microinstruction (for example the instruction P) read from the control memory 120 shown in FIG. 2 is not a particular suboperation instruction such as a branching instruction, the control code in the next address control field (CS next add. contl. field) in the relevant microinstruction produces an indication that the relevant instruction is not a branching instruction. This indication is also supplied to the first multiplexer 181 and the second multiplexer 182 by the decoder 125 shown in FIG. 3. Accordingly, in this situation, the contents (as many as 2 bits of ADRS as shown in FIG. 3) of the next microaddress register (NMAR) 190 holding the microaddress of the instruction P is sent to the microaddress +1 circuit 123 for incrementation by one. Thereafter, the first multiplexer 181 is controlled to allow the #4 to #11 bits from the circuit 123 to pass therethrough, while the second multiplexer 182 allows the #0 to #3 bits from the circuit 123 to pass therethrough. Outputs of both multiplexers are merged and loaded into the NMAR 190 to access the next instruction (P+1) using the new microaddress.

When the microinstruction (for example the instruction Q) read from the control memory 120 shown in FIG. 2 is a branching instruction, the branching address is described or contained in the next address control field in the microinstruction Q and is indicated in the control code. This condition is decoded by the decoder 125 and supplied to the first multiplexer 181 and the second multiplexer 182. When the branching instruction is a conditional branching instruction, the condition is indicated to the selection circuit 124 shown in the figure in order to select based on the conditions. When the branching instruction requires a return to the instruction of Q+1 after branching, this condition is indicated to or stored in the link register 128. As a result, an output (address of instruction (Q+1)) of said microaddress +1 circuit 123 is loaded into the link register 128, and held as the return address when the instruction returns to the initial routine after completion of the branch processing. The selection circuit 124 determines whether the branch is successful based on the status data produced during processing and then sends the result to the first multiplexer 181.

When the branch is successful, the first multiplexer 181 allows the branch address (as many as #4 bits to #11 bits) which is the content of register 126 to pass therethrough. Meanwhile, the second multiplexer 182 causes the #0 and #3 bits in the address of instruction (Q+1) stored in the link register 128 to pass therethrough. The outputs of both multiplexers are loaded as the branch microaddress into the NMAR 190 in a merged form. When the branch is not successful based on the output from the selection circuit 124, output from the microaddress +1 circuit 123, namely the address of instruction (Q+1) is loaded into the NMAR 190.

When the processing of the branch routine corresponding to the branching process has been completed, such is indicated in the control code in the next address control field of the microinstruction (for example as instruction R) read from the control memory 120 at that time. Accordingly, in this situation, the control code is identified or recognized by the decoder 125 shown in FIG. 3 and the decoder 125 then notifies the first multiplexer 181 and the second multiplexer 182. In this case, both multiplexers operate to load the contents of the link register 128 namely the address of the next instruction (Q+1) into the NMAR 190. As described above, the address of the next microinstruction is determined while the control memory 120 shown in FIG. 2 is being accessed.

Next, assume that the instruction having the suboperation code (SOP), which is an object of the present invention, is loaded into the instruction register (IR) 101 shown in FIG. 2. In this case, as is summarized by referring to FIG. 2, the control memory 120 is accessed by the operation code (OP) of relevant instruction and simultaneously, the relevant operation code (OP) is applied to the detection circuit 160. At this same timing, the suboperation control memory (SUBOPCS) 140 is also accessed by the suboperation code (SOP). Thereby, only one microinstruction (for example, instruction S) is read from the control memory 120 shown in FIG. 2. A plurality of portions of different heading addresses corresponding to the relevant suboperation code (SOP) are read from said SUBOPCS 140 and simultaneously only one heading address portion (#6 to #11 bits) is extracted by the selector 150 based on the output from the detection circuit 160. In addition, the remaining portion of the heading address including the bits #4 to #5 are output from the encoder (ENCDE) 170 based on the output of the detection circuit 160. Both outputs are supplied together to the first multiplexer 181 as the #4 to #11 bits. In the processing where the heading address of the microprogram is extracted corresponding to the instruction having suboperation code (SOP) as mentioned above, the specified field of the instruction S or the signal obtained as a result of decoding in the decoder 122 shown in FIG. 2 is set to the logic "1", for example, as the suboperation instruction (subop-inst.) indicated in the upper part of FIG. 3. It is then communicated to the first multiplexer 181. Therefore, in this case, the address data supplied from said selector 150 and encoder 170 is selected and is loaded into the NMAR 190.

We claim:

1. A microprogram control system in a data processing unit which processes an instruction having both an operation code and a suboperation code under microprogram control, said system comprising:
first means accessed by the suboperation code and for storing a plurality of branching destination data in respective storing locations; and
second means for detecting a heading address of a microprogram of the instruction having the suboperation code based on the branching destination data stored in said first means and for decoding the operation code to select one among said plurality of branching destination data, so that a heading microinstruction of a microprogram for the instruction having the suboperation code can be read based on the address produced by said both first and second means.

2. A microprogram control system according to claim 1, further comprising third means accessed by said operation code and for storing the microprogram for executing said microprogram control.

3. A microprogram control system according to claim 2, wherein the heading microinstruction of the microprogram for the instruction having the suboperation code is read after determination of microaddresses of the relevant microinstruction for the operation code, based on the result of accessing said third means with the operation code, the result of accessing said first means with said suboperation code and the result of decoding said operation code using said second means.

4. A microprogram control system in a data processing unit which processes instructions, some of which have both an operation code and a suboperation code and the others have only an operation code, under microprogram control, said system comprising:
first means for determining first branching destination data based on the operation code;
second means, operated simultaneously with said first means, for determining second branching destination data based on the suboperation code, comprising:
  a first storage means, accessed by the suboperation code, for storing a plurality of the first branching destination data in respective storing locations; and
  means for decoding the operation code and determining which of the plurality of the first branching destination data from said first storage means should be selected;
third means, operated simultaneously with said first means, for detecting said instructions having both the operation code and the suboperation code, based on the operation code; and fourth means for selecting, in response to said third means, the first or second branching destination data from said first means and said second means.

5. A microprogram control system according to claim 4, wherein said first means includes second storage means, accessed by the operation code, for storing branching destination data in respective storage locations, and said third means accesses data stored in said second storage means indicating whether the instruction corresponding to the storage location has the suboperation code.

6. A microprogram control system in a data processing unit which processes instructions, some of which have both an operation code and a suboperation code and the others have only an operation code, under microprogram control, said system comprising:

first means for determining first branching destination data based on the operation code;

second means, operated simultaneously with said first means, for determining second branching destination data based on the suboperation code;

third means, operated simultaneously with said first means, for detecting said instructions having both the operation code and the suboperation code, based on the operation code, and including means for outputting a signal varying in response to said detection;

fourth means for selecting, in response to said third means, the first or second branching destination data from said first means and said second means, and including means for outputting a signal varying in response to said selection;

fifth means for coding the output of said third means and outputting said coded output to form part of said second branching destination data; and merging means for merging the output of said fourth and fifth means to form said second branch destination data.

7. A microprogram control system according to claim 6, wherein said merging means includes means for outputting said second branch destination data and said system further comprises:

sixth means for selecting one of said second branch destination data and said first branch destination data, and for generating a next microaddress.

* * * * *